(12) United States Patent
Mangold et al.

(10) Patent No.: US 11,009,103 B2
(45) Date of Patent: May 18, 2021

(54) MULTI-SPEED GEARBOX FOR AN ELECTRICALLY DRIVABLE VEHICLE, AND VEHICLE HAVING SUCH A MULTI-SPEED GEARBOX

(71) Applicant: Bayerische Motoren Werke Aktiengesellschaft, Munich (DE)

(72) Inventors: Julian Mangold, Munich (DE); Thomas Schleich, Weilheim (DE)

(73) Assignee: Bayerische Motoren Werke Aktiengesellschaft, Munich (DE)

( * ) Notice: Subject to any disclaimer, the term of this patent is extended or adjusted under 35 U.S.C. 154(b) by 0 days.

(21) Appl. No.: 16/702,840

(22) Filed: Dec. 4, 2019

(65) Prior Publication Data

US 2020/0103005 A1 Apr. 2, 2020

Related U.S. Application Data

(63) Continuation of application No. PCT/EP2018/066187, filed on Jun. 19, 2018.

(30) Foreign Application Priority Data

Jul. 12, 2017 (DE) ..................... 10 2017 211 976.4

(51) Int. Cl.
*F16H 3/66* (2006.01)
*F16H 57/08* (2006.01)

(52) U.S. Cl.
CPC .............. *F16H 3/66* (2013.01); *F16H 57/082* (2013.01); *F16H 2200/2097* (2013.01); *F16H 2700/06* (2013.01)

(58) Field of Classification Search
CPC .................................................... F16H 57/082
See application file for complete search history.

(56) References Cited

U.S. PATENT DOCUMENTS

| 2,220,174 A | 11/1940 | Ravigneaux |
| 4,848,177 A | 7/1989 | Miura et al. |
| 2015/0167788 A1 | 6/2015 | Beck et al. |

FOREIGN PATENT DOCUMENTS

| DE | 38 14 609 A1 | 11/1988 |
| DE | 10 2014 200 720 B3 | 2/2015 |

(Continued)

OTHER PUBLICATIONS

International Search Report (PCT/ISA/210) issued in PCT Application No. PCT/EP2018/066187 dated Oct. 4, 2018 with English translation (six (6) pages).

(Continued)

*Primary Examiner* — Derek D Knight
(74) *Attorney, Agent, or Firm* — Crowell & Moring LLP

(57) ABSTRACT

A multi-speed gearbox for a vehicle has fewer than 4 shiftable gears and has a gearbox input shaft, a gearbox output shaft, a gearbox housing and a planetary gearbox. The planetary gearbox has a planetary gearbox gear set, which has the following planetary gearbox elements: a sun gear, a first ring gear, and a second ring gear, at least one first planetary gear, which is engaged with both the sun gear and the first ring gear, at least one second planetary gear, which is engaged with the second ring gear, and with a planetary gear carrier, on which the at least one first planetary gear is rotatably mounted. The planetary gearbox gear set has multiple shift elements, which are designed to selectively connect one of the planetary gearbox elements to a further one of the planetary gearbox elements or to the gearbox housing for conjoint rotation and therefore to provide different gears. The at least one second planetary gear is mounted rotatably on the planetary gear carrier and is engaged with the first planetary gear, and the second ring gear can be selectively connected by way of a first of the shift elements to the gearbox housing for conjoint rotation, (Continued)

and the sun gear can be selectively connected by way of a second of the shift elements to the gearbox housing for conjoint rotation.

8 Claims, 1 Drawing Sheet

(56) References Cited

FOREIGN PATENT DOCUMENTS

| | | |
|---|---|---|
| DE | 10 2013 016 441 A1 | 4/2015 |
| DE | 10 2013 226 473 A1 | 6/2015 |
| DE | 10 2015 101 042 A1 | 7/2016 |
| JP | 1-112057 A | 4/1989 |
| JP | 01112057 A * | 4/1989 ............... F16H 3/66 |
| WO | WO 2008/017439 A1 | 2/2008 |

OTHER PUBLICATIONS

German-language Written Opinion (PCT/ISA/237) issued in PCT Application No. PCT/EP2018/066187 dated Oct. 4, 2018 (11 pages).
German-language Office Action issued in counterpart German Application No. 102017211976.4 dated Mar. 14, 2018 (five (5) pages).
Belz T., "Varianten Von Mehrgang-Planetengetrieben", Mar. 8, 2016, pp. 1-19, XP055257458, (19 pages).
"Variants of Multi-Speed Planetary Transmissions", English Translation of document C4 ("Varianten Von Mehrgang-Planetengetrieben") (two (2) pages).

* cited by examiner

MULTI-SPEED GEARBOX FOR AN ELECTRICALLY DRIVABLE VEHICLE, AND VEHICLE HAVING SUCH A MULTI-SPEED GEARBOX

CROSS REFERENCE TO RELATED APPLICATIONS

This application is a continuation of PCT International Application No. PCT/EP2018/066187, filed Jun. 19, 2018, which claims priority under 35 U.S.C. § 119 from German Patent Application No. 10 2017 211 976.4, filed Jul. 12, 2017, the entire disclosures of which are herein expressly incorporated by reference.

BACKGROUND AND SUMMARY OF THE INVENTION

The invention relates to a multi-speed gearbox and to a vehicle having such a multi-speed gearbox. A multi-speed gearbox and a vehicle having such a multi-speed gearbox are known from DE 10 2013 226 473 A1.

The invention is described below on the basis of a drive train for an electric vehicle with a battery store (BEV), wherein this vehicle can be driven exclusively by means of an electric motor, while this is not to be understood as a restriction of the invention to such an embodiment.

In the case of such an electric vehicle there may occur operating states in which the drive power that is nominally possible can no longer be retrieved from this battery store or from this electric motor; in such a case it is said that the drive system is degraded. In particular, in the case of such a degraded drive system, the drive torque that can be provided by the electric motor is reduced. In particular to be able to provide a sufficient drive torque at the drive wheels of the vehicle in the case of a degraded drive system, multi-speed gearboxes with multiple shiftable transmission ratios, known as gears, are used in BEVs. DE 10 2013 226 473 A1 proposes a gearbox for an electric vehicle with 3 shiftable gears.

An object of the invention is to provide a multi-speed gearbox having a sufficient number of shiftable transmission ratios (gears) and a simple construction. This object is achieved by a multi-speed gearbox and by a vehicle having such a multi-speed gearbox according to the claimed invention.

In the context of the invention, a multi-speed gearbox should be understood as meaning a speed change gearbox which is designed for transmitting drive power from a driving motor to at least one or more drivable drive wheels. In this case, the driving motor is designed for providing a drive power for overcoming driving resistances in a motor vehicle, in particular a passenger car.

Preferably, such a multi-speed gearbox has at least a gearbox input shaft, a gearbox output shaft, a gearbox housing and an epicyclic gearbox having an epicyclic gearbox gear set. Preferably, this epicyclic gearbox gear set is designed for providing different transmission ratios between the gearbox input shaft and the gearbox output shaft. Preferably, the multi-speed gearbox is designed for providing different transmission ratios in discrete stages, known as gears. Preferably, the multi-speed gearbox has precisely 3 or fewer shiftable transmission ratios. Also preferably, the multi-speed gearbox has two shifting elements and two discrete transmission ratios that can be shifted by said shifting elements, and the multi-speed gearbox preferably has three shifting elements and three discrete transmission ratios that can be shifted by said shifting elements.

In the context of the invention, such an epicyclic gearbox should be understood as meaning a gear mechanism which has at least one epicyclic gearbox gear set. Furthermore, such an epicyclic gearbox gear set should be understood as meaning a planetary gearbox gear set or a gearbox gear set that is made up of one or more complete or reduced planetary gearbox gear sets. Preferably, a complete planetary gearbox gear set should be understood as meaning a planetary gearbox gear set having a sun gear, a ring gear, a planetary gear carrier and at least one or more planetary gears mounted on this planetary gear carrier, and a reduced planetary gearbox gear set should be understood in the context of the invention as meaning a planetary gearbox gear set which does not have at least one of the aforementioned gearbox elements (sun gear, ring gear, planetary gear carrier), or a number of these elements.

The present epicyclic gearbox gear set preferably has the following epicyclic gearbox elements, a sun gear, a first ring gear and a second ring gear, at least one first planetary gear, which is preferably in engagement both with the first sun gear and with the first ring gear, and a second planetary gear, which is preferably in engagement with the second ring gear, and a planetary gear carrier, on which preferably the at least one first planetary gear and the at least one second planetary gear are rotatably mounted. Preferably, the first planetary gear and the second planetary gear are in engagement with one another. Also preferably, the epicyclic gearbox gear set has multiple first planetary gears and preferably multiple second planetary gears.

Preferably, the epicyclic gearbox gear set is arranged with respect to torque transmission between the gearbox input shaft and the gearbox output shaft, and also preferably spur-gear stages are provided for the kinematic connection, so that, by means of the epicyclic gearbox gear set, drive power coming from the driving motor can be transmitted from the gearbox input shaft via the epicyclic gearbox gear set to the gearbox output shaft. Also preferably, the gearbox input shaft and the gearbox output shaft are arranged axially parallel to one another and preferably radially at a distance from one another. In an embodiment that is also preferred, the gearbox input shaft and the gearbox output shaft are arranged coaxially in relation to one another.

In the context of the invention, in engagement should be understood as meaning that 2 gear wheels contact for power transmission, in particular two gear wheels mesh with one another for power transmission when they are in engagement with one another.

Preferably, the epicyclic gearbox has multiple shifting elements, wherein such a shifting element is designed for selectively connecting one of the aforementioned epicyclic gearbox elements to a further one of these epicyclic gearbox elements or to the gearbox housing for conjoint rotation. In particular, this selective connection for conjoint rotation allows different transmission ratios between the gearbox input shaft and the gearbox output shaft to be provided by the epicyclic gearbox, and consequently allows the epicyclic gearbox to be shifted to different gears by means of the shifting elements.

Preferably, the epicyclic gearbox gear set is constructed in such a way that this at least one second planetary gear is in engagement with this at least one first planetary gear and that preferably the second ring gear can be selectively connected to the gearbox housing for conjoint rotation by a first switching element (of these multiple shifting elements), and also preferably the sun gear can be selectively connected to the gearbox housing for conjoint rotation by a second of these shifting elements (of these multiple shifting elements).

Preferably, such a shifting element is formed as a brake, clutch or synchronizing device, these shifting elements being generally designed for selectively forming a frictional, interlocking or frictional/interlocking connection for conjoint rotation.

In particular, such a construction of the epicyclic gearbox gear set makes a compact construction possible and also good efficiency in the transmission of the drive power.

In particular, it is made possible by means of such an arrangement of the shifting elements that they transmit a relatively small torque in the closed state (torque is transmittable), and thus a compact construction of these elements is made possible. Preferably, the multi-speed gearbox is intended for transverse installation in a motor vehicle, more preferably for longitudinal installation.

In a preferred embodiment of the invention, the first ring gear can be selectively connected to the second ring gear for conjoint rotation by a third of these shifting elements (of these multiple shifting elements). If this third shifting element is closed, a rolling of the first and second planetary gears with respect to the first and second ring gears is prevented and a power transmission takes place from the gearbox input shaft to the gearbox output shaft without rolling power losses in the epicyclic gearbox, and consequently with a high efficiency. In particular by means of such a design of the epicyclic gearbox, a graduation of the individual transmission ratios that is suitable for motor vehicle construction can be achieved.

In a preferred embodiment of the multi-speed gearbox, drive power can be fed to it from a driving motor via the gearbox input shaft, and furthermore this drive power can be transmitted in the direction of the gearbox output shaft via the epicyclic gearbox. From the gearbox output shaft, this drive power can be delivered, preferably to a drive train adjoining the multi-speed gearbox.

In the transmission (direction from the driving motor to the drivable wheel(s)), the drive power can be fed to the first ring gear, as the first of the epicyclic gearbox elements. From the epicyclic gearbox gear set, the drive power can be fed from the planetary gear carrier, as the last of the epicyclic gearbox elements, to the gearbox output shaft. In this case, first and last apply to the power transmission from the gearbox input shaft to the gearbox output shaft. In particular, such a construction of the multi-speed gearbox makes a compact construction possible, and also good efficiency in the transmission of the drive power.

In a preferred embodiment of the invention, with respect to the torque transmission, a first spur-gear gearbox is arranged between the gearbox input shaft and the first ring gear. In particular by means of this first spur-gear gearbox, drive power can be fed to the first ring gear from the gearbox input shaft, preferably can be fed directly. In particular by means of such a first spur-gear gearbox, the speed, or the torque, that can be provided by a driving motor can be adapted to the load requirement resulting from driving resistances.

In a preferred embodiment of the invention, a second spur-gear gearbox is arranged between the gearbox output shaft and the planetary gear carrier, with respect to the torque transmission. In particular by means of this second spur-gear gearbox, drive power can be fed to the gearbox output shaft, preferably can be fed directly. In particular by means of such a second spur-gear gearbox, the speed, or the torque, that can be provided by a driving motor can be adapted to the load requirement resulting from driving resistances.

In a preferred embodiment, the multi-speed gearbox has a first spur-gear gearbox and a second spur-gear gearbox. With this or these spur-gear gearbox(es), a speed adaptation of a driving motor (driving motor of which drive power can be delivered to the gearbox input shaft) is made possible, in particular in the case of a high-speed driving motor (driving speed of up to over 10 000 rpm) to reduce the speed that can be delivered by the gearbox output shaft by means of a spur-gear stage or by means of two spur-gear stages.

In a preferred embodiment of the invention, the epicyclic gearbox has precisely three shifting elements; preferably, the epicyclic gearbox has this first shifting element, this second shifting element and this third shifting element. Also preferably, this epicyclic gearbox can be shifted by means of these three shifting elements into precisely three different transmission stages. Preferably, for forming a transmission ratio, at least one of the shifting elements is closed (torque is transmittable), and preferably the two other shifting elements are open (no torque is transmittable). For changing the transmission ratio, preferably the one closed shifting element is opened and also preferably one of the two other opened shifting elements is closed. In particular by means of such a design of the multi-speed gearbox, a sufficient number of different gears can be provided, with at the same time a small installation space requirement.

Furthermore, a vehicle, in particular a passenger car, having a multi-speed gearbox of the type described above is provided, and also preferably this vehicle has an electric motor as the driving motor, which for torque transmission, that is in particular for the transmission of an electric motor driving power, can be coupled to the gearbox input shaft, or preferably is already coupled to it.

In a preferred embodiment of the invention, this vehicle can be driven exclusively by this electric motor or by multiple electric motors as a single drive source for overcoming the driving resistances.

In particular, the vehicle is therefore designed as a so-called BEV (battery electric vehicle). In particular in the case of such a BEV, the proposed drive can be used particularly advantageously because of a degradation of the drive system, in particular in order to be able to provide a sufficient tractive force of the vehicle.

In a preferred embodiment of the invention, the vehicle has a multi-speed gearbox having precisely three shifting elements, and consequently having precisely three shifting gears, and also this vehicle can be driven exclusively by one or more electric motors as a single drive source. To put it another way, the vehicle is therefore designed as a BEV, having a multi-speed gearbox of the type described above designed as a three-speed gearbox.

Particularly advantageously, the specified multi-speed gearbox can be used in the case of electric motors with a high rated speed; in this context, a high rated speed should be understood as meaning a speed of the electric motor of more than 10 000 rpm, and preferably of more than 14 000 rpm and particularly preferably of 17 000 rpm or more.

Other objects, advantages and novel features of the present invention will become apparent from the following detailed description of one or more preferred embodiments when considered in conjunction with the accompanying drawings.

DETAILED DESCRIPTION OF THE DRAWINGS

Figure 1:
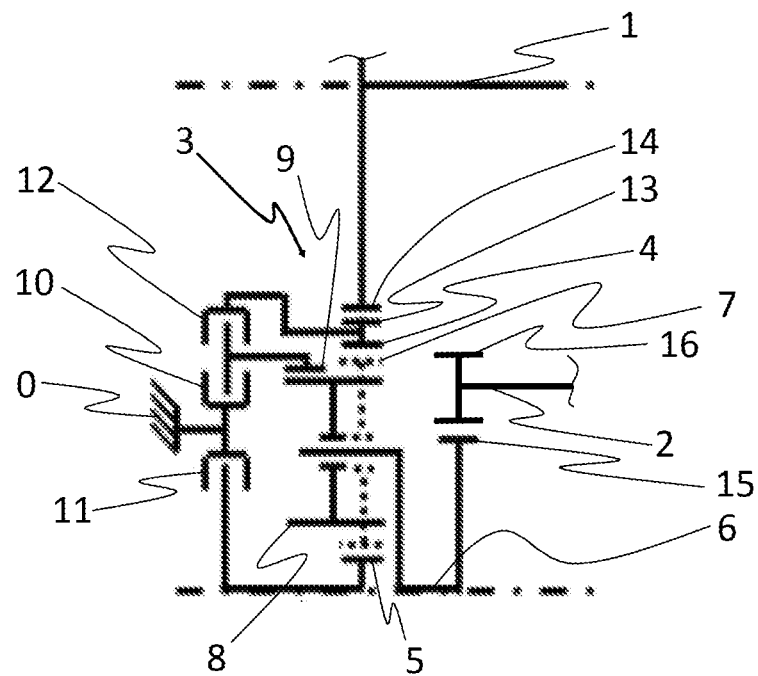
FIG. 1 shows a schematized section of a multi-speed gearbox.

The multi-speed gearbox is designed for transmitting drive power from a driving motor (not shown) via the gearbox input shaft 1 for overcoming driving resistances of the motor vehicle in the drive train of which this multi-speed gearbox is used. This drive power is transmitted by a first spur-gear gearbox having a first spur gear 13 and a second spur gear 14 to the first ring gear 4 of the epicyclic gearbox 3.

The first ring gear 4 belongs to the epicyclic gearbox gear set of the epicyclic gearbox 3, and this epicyclic gearbox gear set has the sun gear 5, the planetary gear carrier 6, the first planetary gear 7 and the second planetary gear 8, which are mounted rotatably on the planetary gear carrier 6, and the second ring gear 9. On account of the representation, only one first planetary gear 7 and one second planetary gear 8 are shown, but the epicyclic gearbox gear set has multiple of these planetary gears 7, 8. For power transmission, the first ring gear 4 is in engagement with the first planetary gear 7, and the first planetary gear 7 is engagement with the second planetary gear 8. In order that these two planetary gears 7, 8 can be in engagement with one another, the first planetary gear 7 is offset with respect to the second planetary gear 8 in the circumferential direction; in order to represent this, the first planetary gear 7 is shown by dashed lines. For power transmission, the second planetary gear 8 is in engagement with the second ring gear 9. Furthermore, the first planetary gear 7 is in engagement with the sun gear 5.

In order to be able to provide different transmission ratios between the gearbox input shaft 1 and the gearbox output shaft 2, the multi-speed gearbox has the first shifting element 10, the second shifting element 11 and also the third shifting element 12. With the first shifting element 10, the second ring gear 9 can be selectively connected to the gearbox housing 0 for conjoint rotation. By the second shifting element 11, the sun gear 5 can be selectively connected to the gearbox housing 0 for conjoint rotation. By the third shifting element 12, the first ring gear 4, and consequently the first spur gear 13 of the first spur-gear gearbox, can be selectively connected to the second ring gear 9 for conjoint rotation.

The drive power provided by the driving motor can be fed to the gearbox output shaft 2 via the planetary gear carrier 6 and a second spur-gear gearbox having a first spur gear 15 and a second spur gear 16.

In the embodiment shown, the first ring gear 4 is configured at least partly as a gear wheel rings which has the ring gear toothing for the first ring gear 4 and an external toothing for the first spur gear 13 of the first spur-gear gearbox. In particular by means of such a configuration, a small installation space requirement in the axial direction can be achieved.

Figure 2:
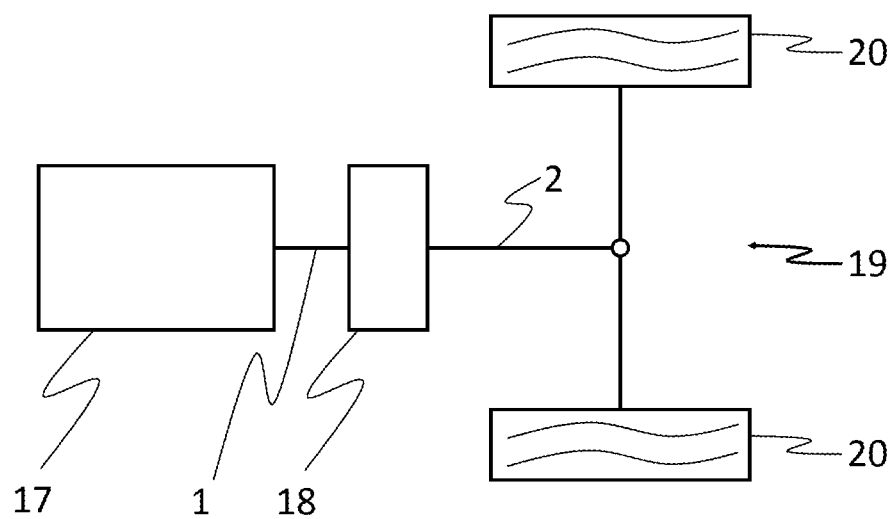
FIG. 2 shows a schematized drive train with such a multi-speed gearbox.

In FIG. 2, a schematized drive train having a multi-speed gearbox 18 of the type described above is shown. The multi-speed gearbox 18 can be fed drive power from the electric motor 17 via the gearbox input shaft 1 for overcoming driving resistances.

Depending on the shifting state, the multi-speed gearbox 18 delivers this drive power from the gearbox input shaft 1 via the gearbox output shaft 2 with a certain transmission ratio. Furthermore, the drive train has a drivable vehicle axle 19, which is connected to the gearbox output shaft 2 for conjoint rotation. Arranged on the drivable vehicle axle 19 are the drivable wheels 20, with which the drive power delivered by the gearbox output shaft 2 can be transmitted to the roadway surface (not shown).

LIST OF DESIGNATIONS

1 Gearbox input shaft
2 Gearbox output shaft
3 Epicyclic gearbox
4 First ring gear
5 Sun gear
6 Planetary gear carrier
7 First planetary gear
8 Second planetary gear
9 Second ring gear
10 First shifting element
11 Second shifting element
12 Third shifting element
13 First spur gear of the first spur-gear gearbox
14 Second spur gear of the first spur-gear gearbox
15 First spur gear of the second spur-gear gearbox
16 Second spur gear of the second spur-gear gearbox
17 Electric motor
18 Multi-speed gearbox
19 Drivable vehicle axle
20 Drivable wheel The foregoing disclosure has been set forth merely to illustrate the invention and is not intended to be limiting. Since modifications of the disclosed embodiments incorporating the spirit and substance of the invention may occur to persons skilled in the art, the invention should be construed to include everything within the scope of the appended claims and equivalents thereof.

What is claimed is:
1. A multi-speed gearbox having fewer than four shiftable gears for a vehicle, comprising:
  a gearbox input shaft;
  a gearbox output shaft;
  a gearbox housing;
  an epicyclic gearbox, the epicyclic gearbox comprising an epicyclic gearbox gear set with gearbox elements of:
    a sun gear, a first ring gear and a second ring gear, at least one first planetary gear, which is in engagement both with the sun gear and with the first ring gear, at least one second planetary gear, which is in engagement with the second ring gear, and with a planetary gear carrier, on which the at least one first planetary gear is rotatably mounted; and
  a first spur-gear gearbox arranged between the gearbox input shaft and the first ring gear such that drive power from the gearbox input shaft passes directly to the first ring gear,
  wherein
    one of the first spur-gear gearbox gears is located at an external circumference of the first ring gear,
    the epicyclic gearbox gear set has multiple shifting elements for selectively connecting one of the epicyclic gearbox elements to a further one of the epicyclic gearbox elements or to the gearbox housing to provide different gears,
    the at least one second planetary gear is rotatably mounted on the planetary gear carrier and is in engagement with the first planetary gear,
    the second ring gear is selectively connectable to the gearbox housing for conjoint rotation by a first of the shifting elements, and the sun gear is selectively connectable to the gearbox housing by a second of the shifting elements.

2. The multi-speed gearbox according to claim 1, wherein the first ring gear is selectively connectable to the second ring gear for conjoint rotation by a third of the shifting elements.

3. The multi-speed gearbox according to claim 1, wherein drive power is fed via the gearbox input shaft and said drive power is transmitted in the direction of the gearbox output shaft via the epicyclic gearbox and is delivered by the gearbox output shaft, and in said transmission, the drive power is fed to the first ring gear, as the first of the epicyclic gearbox elements, and said drive power is fed from the planetary gear carrier, as the last of the epicyclic gearbox elements, to the gearbox output shaft.

4. The multi-speed gearbox according to claim 1, wherein a second spur-gear gearbox is arranged between the planetary gear carrier and the gearbox output shaft, such that drive power passes directly to the gearbox output shaft from the planetary gear carrier.

5. The multi-speed gearbox according to claim 1, wherein the multi-speed gearbox has precisely three shifting elements and is shiftable into precisely three different gears by said three shifting elements.

6. A vehicle comprising a multi-speed gearbox according to claim 1.

7. The vehicle according to claim 6, further comprising:
at least one electric motor, which is connectable to the gearbox input shaft for transmission of electric motor drive power.

8. The vehicle according to claim 7, wherein
the multi-speed gearbox has precisely three shifting elements and precisely three gears, and
the electric motor is the only drive source of the vehicle.

* * * * *